U. S. ARMSTRONG.
THREAD PROTECTOR.
APPLICATION FILED DEC. 19, 1914.
1,185,963.
Patented June 6, 1916.
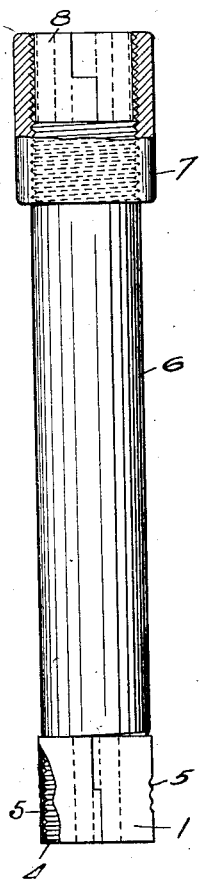
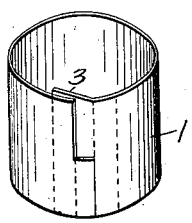
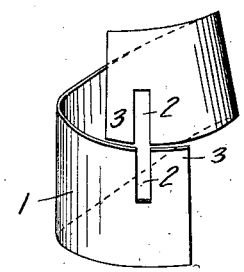
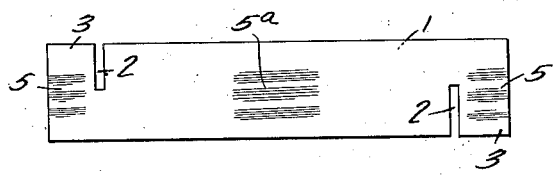
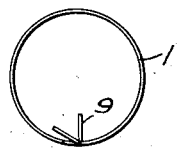
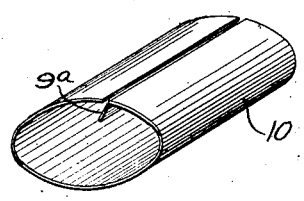
WITNESSES
INVENTOR

UNITED STATES PATENT OFFICE.

ULYSSES S. ARMSTRONG, OF PITTSBURGH, PENNSYLVANIA.

THREAD-PROTECTOR.

1,185,963.          Specification of Letters Patent.          Patented June 6, 1916.

Application filed December 19, 1914. Serial No. 878,174.

*To all whom it may concern:*

Be it known that I, ULYSSES S. ARMSTRONG, a resident of Pittsburgh, in the county of Allegheny and State of Pennsylvania, have invented a new and useful Improvement in Thread-Protectors, of which the following is a specification.

This invention relates to thread protectors, and particularly for protecting pipe threads during the application of a coating layer of lacquer or enamel thereto.

The object of the invention is to provide a simple device of this kind which can be manufactured cheaply, which can be readily applied to the pipe, which will prevent the bath of lacquer or enamel from coating the pipe threads, and which also forms an efficient protector for preventing injury to the threads in handling the pipes and transporting them to the place of use.

The invention comprises the thread protector hereinafter described and claimed.

In the drawings, Figure 1 represents a side elevation of a section of pipe and a coupling with thread protectors applied thereto; Fig. 2 is a perspective view on a larger scale, of one form of thread protector; Fig. 3 is a similar view showing the manner of assembling the same; Fig. 4 is a plan view of the protector before being bent to final form; Fig. 5 is an end view of a modified form of protector; and Fig. 6 is a perspective view of another form of protector.

Pipes or conduits for containing electric wiring require a smooth inner surface to enable the wires to be readily drawn through the pipes, and also an efficient coating or layer of some material which will protect the pipe from corrosion and deterioration. Commonly conduits for electric wiring are made of iron or steel provided with a coating or layer of lacquer or some flexible enamel, which is applied by dipping the pipe into a bath of the coating material and then baking the coated pipe in an oven. Such pipes are usually threaded before being coated with enamel, and if the threads are not protected in some manner the enamel coating adheres to and fills up the pipe threads and makes it difficult to secure the pipes to each other or to connecting couplings, sleeves or other fittings without recutting or running the die over the pipe or a tap through the coupling to remove the coating from the threads.

To overcome the difficulties above referred to, I apply to the threaded end of each pipe or coupling section, before placing the same in the enamel bath, a protecting device which prevents the enamel coating from adhering to the threads and leaves them uncoated, and which also is allowed to remain on the pipe after the baking operation and forms an efficient protection against external injury to the threads in handling the pipes and transporting them to the place where used.

The protector shown in the drawings is formed of a flat metal sheet 1 which is of such gage that it can be easily bent into cylindrical form but is stiff enough to withstand blows which the pipe might receive in handling. It can be made from any suitable material, such as thin sheet iron, steel or the like, and if desired, can be galvanized or otherwise provided with a rust-resisting coating, although this is not essential. The width of the sheet is equal to the length of the threaded portion of the pipe, while its length is something more than the pipe' circumference. Said sheet is provided on two of its opposite edges with inwardly extending slits or notches 2, which can be made by merely shearing the sheet or by removing a narrow strip therefrom. The slits 2 in the opposite side edges of the sheet are parallel to and are located adjacent to the opposite ends thereof and are of a length equal to substantially one half the width of the sheet. These slits form substantially hook-shaped end members 3 which are at a distance from each other substantially equal to the circumference of the pipe.

To apply the thread protector to the pipe the slitted sheet is rolled or bent into cylindrical form, the axis of the cylinder being parallel with the length of the slits 2, and the hook-shaped members 3 are interlocked with or hooked into each other, as shown in Fig. 3, said hook-shaped members being placed on the inside of the cylinder, so that both thereof contact with the pipe threads when the protector is applied thereto and are therefore protected from injury.

The protector is slipped over the threaded end of the pipe, as shown in Fig. 1, and hugs the threads very closely, due to the resiliency of the metal and the loose connection of the ends of the sheet, which enables the protector to conform to the taper of the threads.

In order to protect the end edge of the pipe one side edge of the sheet metal protector may be crimped or bent, either before or after bending it to cylindrical form, to form a flange 4 extending inwardly toward the axis of the protector, and which covers the end of the pipe and prevents injury to the threads, and also forms a stop to prevent the protector from being pushed too far up on the threads. Also, the protector may be crimped or bent to provide corrugations or projections which will enter between the threads of the pipe and prevent it from escaping therefrom by shaking or dropping off. These projections or corrugations may be located at one or both ends of the sheet 1, as at 5, or may be pressed into the body of the sheet, as indicated at 5ª. In applying the protector the corrugations pass over the pipe threads and when it reaches its final position prevent the protector from dropping off from the pipe.

While the protector may not entirely prevent coating of the pipe threads, it is found to form an efficient protector for preventing most if not all of the enamel coating from adhering to the threads, due to the fact that an iron or steel device will not take a good coating of enamel if its surface is closely adjacent to another iron or steel member while immersed in the bath. If a number of pipes are placed in the bath fairly close to each other it is found that when baked in the oven these pipes have uncoated longitudinal streaks where they lie close to each other. This is probably due to some coaction between the adjacent metal surfaces, but in any case is taken advantage of in this protector, which is found to prevent the coating from adhering to the pipe threads.

After the pipes are baked the protector is allowed to remain and forms an efficient protection against external knocks or blows to which the pipe is subjected in handling and transporting the same. When the pipe is to be used the protector can be readily removed by merely catching one of its free edges with a pair of pliers and tearing it loose.

The protector can also be used for internal threads on couplings, sleeves or other fittings. For example, Fig. 1 shows a pipe 6 provided with an internally threaded coupling 7 in which is located a protector 8. This protector is of the same construction and arrangement as that before described, except that one of its end edges is bent inwardly or toward the axis of the cylinder, as shown at 9, which leaves a projecting edge portion which can be readily grasped with the pliers for removing the protector from the pipe or nipple. This protector closely hugs the threads within the pipe, due to the resiliency and expansion of the thin sheet metal.

The internal thread protector may also be of the form shown in Fig. 6, which consists of a plain rectangular metal sheet 10 bent into cylindrical form and having one of its longitudinal edges bent inwardly, as shown at 9ª. This sheet is left unslitted because the end portions of the protector do not have to be secured to each other as in the case of a protector for external threads.

What I claim is:

1. A thread protector, comprising a thin sheet metal member having two of its opposite edges provided with slits extending part way across the sheet and lying parallel with each other, said slits being substantially wider along the length of the sheet than the thickness of the metal.

2. A thread protector, comprising a thin sheet metal member having two of its opposite edges provided with slits extending normally to said edges and parallel to each other, the slitted portions of said member being loosely interlocked whereby they can assume various positions relative to each other.

3. A thread protector, comprising a thin sheet metal member having two of its opposite side edges provided with slits extending part way across the sheet and lying parallel with each other, the slitted portions of said member being loosely interlocked to form a ring capable of accommodating itself to a tapered thread.

4. A thread protector, comprising a thin sheet metal member having two of its opposite side edges provided with slits extending part way across the sheet and lying parallel with each other, the slits in opposite edges being adjacent opposite ends of the sheet, the slitted portions of said member being loosely interlocked to form a ring capable of accommodating itself to a tapered thread.

5. A thread protector, comprising a thin sheet metal member having two of its opposite side edges provided with slits extending part way across the sheet and lying parallel with each other, the slits in opposite edges being adjacent opposite ends of the sheet and forming hook-shaped end members, said hook-shaped members being loosely interlocked to form a flexible ring capable of accommodating itself to a tapered thread.

6. A thread protector, comprising a thin sheet metal member having two of its opposite side edges provided with slits extending part way across the sheet and lying parallel with each other, the slits in opposite edges being adjacent opposite ends of the sheet and forming hook-shaped end members, said sheet being bent into cylindrical form and having said hook-shaped end members interlocked with each other and lying on the inside of the cylinder, said hook-shaped members being loosely interlocked to form a flexible ring capable of accommodating itself to a tapered thread.

7. A thread protector, comprising a thin, flexible sheet metal member having hook-shaped end portions and bent into cylindrical form with its opposite ends interlocked with each other, said member being adapted to cover and conform to the pipe threads and having projections for engaging with the same.

8. A thread protector, comprising a thin, flexible sheet metal member bent to cylindrical form and having its end portions loosely interlocked with each other, one of the edges of said protector being bent to form a flange for covering the end edge of the pipe, said protector being adapted to accommodate itself to a tapered thread.

In testimony whereof, I have hereunto set my hand.

ULYSSES S. ARMSTRONG.

Witnesses:
WILLIAM B. WHARTON,
ELBERT L. HYDE.